US009869334B2

(12) United States Patent
Gstach et al.

(10) Patent No.: US 9,869,334 B2
(45) Date of Patent: Jan. 16, 2018

(54) EXPANSION ANCHOR WITH GROOVES IN THE EXPANSION CONE

(71) Applicant: Hilti Aktiengesellschaft, Schaan (LI)

(72) Inventors: Peter Gstach, Bludesch (AT); Bernhard Winkler, Feldkirch (AT); Matteo Spampatti, Addison, TX (US)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 15/034,743

(22) PCT Filed: Nov. 4, 2014

(86) PCT No.: PCT/EP2014/073630
§ 371 (c)(1),
(2) Date: May 5, 2016

(87) PCT Pub. No.: WO2015/067578
PCT Pub. Date: May 14, 2015

(65) Prior Publication Data
US 2016/0298667 A1  Oct. 13, 2016

(30) Foreign Application Priority Data

Nov. 6, 2013  (EP) .................................. 13191706

(51) Int. Cl.
*F16B 13/06* (2006.01)
(52) U.S. Cl.
CPC ............ *F16B 13/065* (2013.01); *F16B 13/06* (2013.01)
(58) Field of Classification Search
CPC ...... F16B 13/004; F16B 13/045; F16B 13/06; F16B 13/065; F16B 13/0841; F16B 13/0858; F16B 13/0875; F16B 2013/006
(Continued)

(56) References Cited

U.S. PATENT DOCUMENTS 4,656,806 A * 4/1987 Leibhard ............... F16B 13/065
411/15
4,906,148 A * 3/1990 Schule ................. E04D 3/3603
411/34
(Continued)

FOREIGN PATENT DOCUMENTS

CN   202381474 U   8/2012
CN   102748354 A   10/2012
(Continued)

OTHER PUBLICATIONS

International Search Report issued in International counterpart application No. PCT/EP2014/073630 dated Jan. 20, 2015, with partial English translation (Five (5) pages).
(Continued)

*Primary Examiner* — Roberta S Delisle
(74) *Attorney, Agent, or Firm* — Crowell & Moring LLP

(57) ABSTRACT

An expansion anchor with a bolt and at least one expansion element is disclosed. An oblique surface is arranged in the region of the first end of the bolt and forces the expansion element radially outward on the bolt if the bolt is displaced in a pull-out direction relative to the expansion element. The bolt has, in the region of its rear end facing away from the first end, a load-absorber which is suitable for introducing tensile forces which are directed in the pull-out direction into the bolt. At least one groove which is closed with respect to the first end is made in the oblique surface, which groove reduces the contact surface between the expansion element and the oblique surface.

11 Claims, 1 Drawing Sheet

(58) Field of Classification Search
USPC .................................. 411/44, 54, 60.1, 65, 70
See application file for complete search history.

(56) References Cited

U.S. PATENT DOCUMENTS

| | | | | |
|---|---|---|---|---|
| 4,968,200 A | * | 11/1990 | Mark | F16B 13/065 411/55 |
| 4,983,082 A | * | 1/1991 | Mark | F16B 13/065 411/55 |
| 5,176,481 A | | 1/1993 | Schiefer | |
| 5,314,277 A | * | 5/1994 | Fischer | F16B 13/063 411/44 |
| 7,857,564 B2 | * | 12/2010 | Wieser | F16B 13/065 411/354 |
| 8,444,355 B2 | * | 5/2013 | Gaudron | F16B 13/065 411/37 |
| 8,974,162 B2 | * | 3/2015 | Shimahara | B21H 3/022 411/44 |
| 2004/0096288 A1 | * | 5/2004 | Haug | F16B 13/065 411/57.1 |
| 2008/0050195 A1 | * | 2/2008 | Wieser | F16B 13/065 411/44 |
| 2010/0111639 A1 | * | 5/2010 | Gaudron | F16B 13/065 411/354 |
| 2011/0081217 A1 | | 4/2011 | Wissling et al. | |
| 2012/0311947 A1 | * | 12/2012 | Van Wissen | F16B 13/066 52/250 |

FOREIGN PATENT DOCUMENTS

| | | |
|---|---|---|
| CN | 202690634 U | 1/2013 |
| CN | 202690635 U | 1/2013 |
| CN | 202914477 U | 5/2013 |
| DE | 2 256 822 A1 | 6/1974 |
| DE | 10 2011 076 180 A1 | 11/2012 |
| EP | 0 514 342 A1 | 11/1992 |

OTHER PUBLICATIONS

European Search Report issued in European counterpart application No. 13191706.4-1758 dated Apr. 15, 2014, with Statement of Relevancy (Five (5) pages).

Chinese Office Action issued in Chinese counterpart application No. 201480060920.0 dated Nov. 23, 2016 (Eight (8) pages).

* cited by examiner

EXPANSION ANCHOR WITH GROOVES IN THE EXPANSION CONE

This application claims the priority of International Application No. PCT/EP2014/073630, filed Nov. 4, 2014, and European Patent Document No. 13191706.4, filed Nov. 6, 2013, the disclosures of which are expressly incorporated by reference herein.

BACKGROUND AND SUMMARY OF THE INVENTION

The invention relates to an expansion anchor. Such an expansion anchor is equipped with a bolt and an expansion element, and an oblique surface is arranged in the region of the first end of the bolt which forces the expansion element radially outwards if the bolt is displaced in a pull-out direction relative to the expansion element, and the bolt has, in the region of its rear end facing away from the first end, a load-absorbing means which is suitable for introducing tensile forces which are directed in the pull-out direction into the bolt.

A generic expansion anchor is, for example known from U.S. Pat. No. 5,176,481 A. This expansion anchor can be used to anchor components to a bore hole in a solid substrate, for example in concrete. The known expansion anchor has an elongated bolt. The bolt has a cone-shaped expansion section in the region of its first rear end, the expansion section expands towards the first end i.e., against the pull-out direction. An expansion sleeve mounted displaceable towards the first end on the expansion section is arranged in the pull-out direction next to the expansion section. The expansion sleeve has elevations on the outer side which protrude in a radial direction over the bolt and by means of which the expansion sleeve can lock onto the inner wall of the bore hole in the substrate. The expansion anchor is inserted into the bore hole against the pull-out direction with the first end forwards and the bolt is subsequently pulled back out of the bore hole in the pull-out direction to a certain extent. After inserting the expansion anchor, the expansion sleeve is locked onto the inner wall of the bore hole and is thus retained in the bore hole when the bolt is pulled out. The expansion section of the bolt is hereby pulled into the expansion sleeve, and the expansion sleeve is spread apart due to the increasing diameter of the expansion section and the expansion anchor locks with the expansion sleeve in the substrate so that loads can be transferred into the substrate. This basic principle can also be expediently implemented in the invention.

U.S. Pat. No. 5,176,481 A also teaches to provide the bolt with a friction-reducing coating in the region of the expansion sleeve.

Further expansion anchors are known from DE 2256822 A1, and DE 2256822 A1 teaches positive anti-twist protection between the expansion sleeve and bolt. According to DE 2256822 A1, for example, a notch can be provided on the bolt which extends, to a certain extent, into the expansion cone from the neck of the bolt, and a corresponding projection is arranged on the expansion sleeve which follows the notch in the cross-section of the anchor and engages into the notch.

US2011081217 AA and DE102011076180 A1 describe expansion anchors in the case of which the expansion cone has a non-circular cross-section with a plurality of maximum heights and a plurality of minimum heights.

The object of the invention is to indicate a particularly efficient and versatilely usable expansion anchor that is at the same time also particularly reliable and easy to manufacture.

An expansion anchor according to the invention is characterized in that at least one, preferably elongated groove that is closed with respect to the first end of the bolt is made in the oblique surface, the groove reduces the contact surface between the expansion element and the oblique surface.

The invention is based on the knowledge that when expansion anchors are designed, the situation may arise whereby a change to the design of the anchor at one point leads to an improvement of the anchor behavior, but this is, however, associated with losses at other points. It may thus, for example, on the one hand be desirable to provide a high friction coefficient between the oblique surface and the expansion element in order to avoid the oblique surface pulling through the expansion element, i.e., in particular through the expansion sleeve and thus premature failure of the anchor in the case of excessive static tensile loads. On the other hand, a high friction coefficient between the oblique surface and expansion element may increase the probability of the anchor not taking hold at the beginning of the setting process and is pulled out of the bore hole in an undesired manner. Furthermore, an excessively high friction coefficient between the oblique surface and expansion element may be disadvantageous with regard to the dynamic properties in fractured concrete. If namely the friction coefficient between the oblique surface and expansion element is large, then the bolt is drawn deep into the expansion sleeve if a fracture opens in the region of the anchor. However, this process is not reversed for a large friction coefficient if the fracture is subsequently closed again and the oblique surface remains deep in the expansion sleeve which may lead to damage of the surrounding concrete. A low friction coefficient may thus be advantageous for fractured concrete in order to ensure "pumping", i.e., sliding the oblique surface forwards and backwards in the expansion sleeve in the case of a fracture opening and subsequent fracture closure.

In the design of a conventional anchor, a decision must thus be made as to whether a low friction coefficient between expansion element and the oblique surface is selected with regard to good properties in fractured concrete with movable fractures, which is, however, associated with a lower static tensile load, or whether a high friction coefficient is selected, which leads to high static tensile loads, but to inferior properties in fractured concrete.

The invention begins here and provides at least one groove in the expansion region of the bolt in the oblique surface, i.e., in particular a depression which extends radially into the bolt interior from the bolt surface. This groove reduces the frictional contact surface between the expansion element and the oblique surface, i.e., due to the groove, the contact surface between the expansion element and the oblique surface is smaller than if the groove were absent and the oblique surface were advanced there instead of corresponding to the opposing inner surface of the expansion element. The groove can thus reduce the friction in precisely that region of the expansion cone where the expansion element in fractured concrete rubs so that the previously described "pumping" is made easier in the case of a fracture opening and subsequent fracture closure and damage to the concrete is effectively prevented. According to a further basic concept of the invention, the groove is, in this respect, closed with respect to the anchor tip. In particular, the groove is thus covered and not visible when viewed from in front of the anchor with a viewing direction parallel to the longitudinal axis of the bolt. According to the invention, a groove-free region is hereby provided in front of the groove, preferably between the bolt tip and expansion cone. If the expansion element reaches into this groove-free region in the case of large static loads, then the friction of the expansion element can increase disproportionately such that a premature pulling of the bolt through the expansion element is avoided. The previously described contradiction between good properties in fractured concrete and high static tensile loads in unfractured concrete can thus be solved by the groove according to the invention. As a result, a particularly reliable and versatilely usable anchor can be made available in a particularly simple manner. In particular, a costly, friction-reducing coating can often even be dispensed with. In certain load and application areas however, such a coating may also be provided; the invention does not exclude this.

The groove can end at its side facing the anchor tip, i.e., at its side facing away from the rear end of the bolt, already inside the oblique surface or only further forward on the bolt. The local friction-reducing effect of the groove can be based on the reduction of the contact surface between oblique surface and expansion element and/or on other mechanisms such as the inclusion and concentration of bore dust.

According to the invention, the expansion element is arranged, in particular fastened on the bolt displaceable along on the bolt. Insofar as "radial", "axial" and "circumferential direction" are mentioned here, this may, in particular, relate to the longitudinal axis of the bolt which may, in particular, be the symmetry and/or center axis of the bolt. The expansion anchor can preferably be a force-controlled expanding expansion anchor. The expansion element and/or the bolt suitably consist of a metal material which, as already mentioned, can also be coated for further selective influence of the friction. The load-absorbing means can, in particular, be designed as an outer thread or as an inner thread. It serves for introducing tensile forces into the bolt which are directed in the pull-out direction. The bolt can also be partially hollow.

According to the invention, the expansion element is forced radially outwards from the oblique surface and, in this respect, pressed against the bore hole wall in the substrate if the oblique surface, in particular together with the bolt, of the bolt is axially displaced in the pull-out direction relative to the expansion element. The expansion anchor is hereby anchored in the bore hole. Preferably, the pull-out direction runs parallel to the longitudinal axis of the bolt and/or points outside the bore hole. In particular, the direction vector of the pull-out direction can be directed from the oblique surface to the load-absorbing means. At the oblique surface, the distance of the bolt surface from the longitudinal axis of the bolt increases contrary to the pull-out direction, i.e., with increasing distance from the load-absorbing means.

It is particularly preferred for the expansion element to be an expansion sleeve which surrounds the bolt at least in regions and/or for the bolt to have an expansion cone, and the oblique surface is formed by the expansion cone. A particularly balanced introduction of force in the circumferential direction is hereby achieved. According to the invention, the expansion cone is provided for spreading apart the expansion sleeve, i.e., for radially expanding the expansion sleeve. An expansion element or even a plurality of expansion elements can be provided and a corresponding number of oblique surfaces. The expansion sleeve can have expansion slots which start from the front face of the expansion sleeve. These expansion slots can facilitate the radial expansion of the expansion sleeve by the expansion cone of the bolt.

In the case of a so-called bolt anchor, the expansion cone can be arranged axially fixed to the bolt. In this case, the expansion cone is drawn with the oblique surface into the expansion sleeve when the expansion anchor is set by a common axial movement of the bolt and the expansion cone relative to the expansion sleeve. The expansion cone is, in this respect, preferably designed integrally with the bolt. Alternatively, in the case of a so-called sleeve anchor, the expansion cone can be a part that is separate from the bolt and is preferably connected via corresponding threads with the bolt. The drawing of the expansion cone into the expansion sleeve can then preferably be produced at least partially by rotation of the bolt relative to the expansion cone which is implemented by a spindle drive, formed by the corresponding threads, into an axial movement of the expansion cone relative to the bolt.

It is particularly expedient for the bolt to have a tip region which attaches to the expansion cone on the side of the expansion cone facing the first end and in which the cross-section of the bolt is at least as large as in the expansion cone, and the groove ends before the tip region or in the tip region. According to this embodiment, in which before the tip region another relatively large cross-sectional tip region is arranged, into which, in any case, the at least one groove partially extends, a particularly suitable force path may be obtained, which, in particular, effectively counteracts the bolt pulling through the expansion sleeve particularly.

It is particularly preferred for the expansion of the groove in the axial direction of the bolt to be greater than the expansion of the groove in the circumferential direction of the bolt. In particular, the groove can, preferably over its entire length, run on the oblique surface along a projection of the longitudinal axis of the bolt. The groove can, in addition or alternatively, run parallel to the longitudinal axis of the bolt, i.e., in the axis longitudinal direction and/or axial direction. Tilting between the expansion element and bolt can be hereby simply and effectively counteracted.

It is particularly expedient for the inner surface of the expansion element to be smooth in the region of the groove and/or the expansion element to not engage into the groove, in each case at least in the unset starting state of the anchor. In particular, the expansion element advantageously does not have a projection engaging into the groove on its inner side facing the oblique surface and in particular the bolt. A particularly reliable, local friction reduction may be hereby achieved. For the same reason, the region of the inner cross-section of the expansion element which comes to rest against the groove in the set state of the anchor is preferably concave. For example, the inner surface of the expansion element can be designed in a cylindrically concave manner in this region. In particular, the expansion element, at least in the unset starting state of the anchor, is distanced at the groove from the surface of the oblique surface. The expansion element, at least in the starting state of the anchor, thus does not reach into the groove at least not to the base of the groove. The cross-section of the expansion cone in the surface regions of the expansion cone, which run displaced with respect to the groove viewed in the circumferential direction, expediently corresponds to the cross-section of the opposing inner side of the expansion element, whereas the cross-section of the expansion cone at the groove deviates from the cross-section of the opposing inner side of the expansion element. Insofar as a plurality of grooves are provided, the cross-section of the expansion cone between the grooves expediently corresponds to the cross-section of the opposing inner side of the expansion element, whereas the cross-section of the expansion cone at the grooves deviates from the cross-section of the opposing inner side of the expansion element.

Moreover, it is advantageous for a plurality of grooves closed with respect to the first end of the bolt to be made into the oblique surface, which respectively reduce the contact surface between the expansion element and the oblique surface. The friction can even be hereby further reduced and the previously described "pumping" supported even better. The grooves are preferably all the same length. They preferably all begin at the same axial position and/or preferably all end at the same axial position. Insofar as a plurality of grooves according to the invention are provided, the features described in this document can apply for one of these grooves, for a part of the grooves or for all grooves. It is particularly preferred for at least four grooves closed with respect to the first end of the bolt to be made into the oblique surface, in particular at least one groove per cross-sectional quadrant of the bolt, with regard to its longitudinal axis, which may then in particular be advantageous if the expansion element is an expansion sleeve and the oblique surface is formed by an expansion cone. The bolt preferably has a circular segment-shaped cross-section between adjacent grooves.

In particular for a particularly balanced force path and thus high loads and high reliability, provision can also be made for the grooves, in particular in the cross-section perpendicular to the longitudinal axis of the bolt, to be arranged equidistant and/or for the grooves to be distributed evenly around the expansion cone. The last-mentioned feature can then be advantageous in particular if the expansion element is an expansion sleeve. Equidistant arrangement can, in particular, be understood as adjacent grooves always having the same angular distance at the bolt longitudinal axis in the cross-section of the anchor perpendicular to the bolt longitudinal axis.

The grooves are particularly effective if the contact surface between the expansion element and the oblique surface is reduced by the grooves by 20 to 50%.

The individual grooves are expediently relatively narrow, for example in order to avoid the expansion element being bent into the grooves when it is spread apart. Accordingly, it is particularly preferred for the maximum angular width of the at least one groove measured in the cross-section of the bolt at the longitudinal axis to be smaller than 30°, in particular smaller than 15°.

The invention can, in particular, be used in bolt anchors in which the expansion sleeve does not reach to the bore hole mouth in the case of the set anchor. Because in the case of bolt anchors, the expansion process is particularly strongly influenced by the individual frictional processes at the anchor. Accordingly, a stop can be designed on the bolt which limits a displacement of the expansion element away from the oblique surface, in particular a displacement in the pull-out direction. Such a stop can, in the case of a bolt anchor, particularly simply ensure that the expansion element, together with the bolt, reliably penetrates into the bore hole. The stop is preferably an annular shoulder which may be advantageous in terms of manufacturing and in relation to reliability. In particular, the stop is axially arranged between the oblique surface and the load-absorbing means.

The invention is explained in greater detail below by means of preferred exemplary embodiments, which are schematically depicted in the enclosed figures, and individual features of the exemplary embodiments shown below can be implemented in the context of the invention essentially individually or in any combination.

DETAILED DESCRIPTION OF THE DRAWINGS

Figure 1:
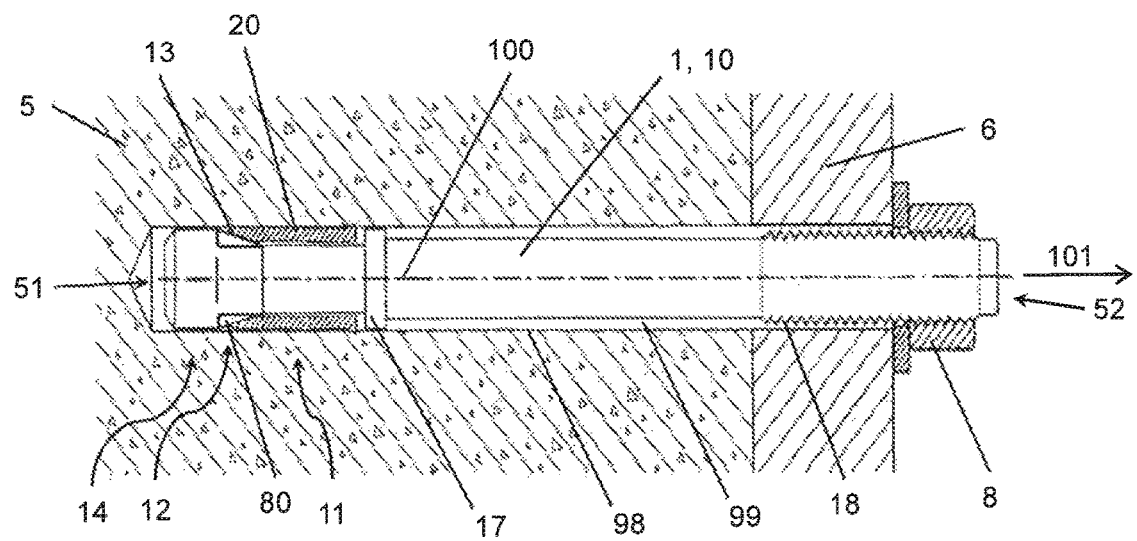
FIG. 1 is a partial longitudinal section view of an expansion anchor according to the invention set in a concrete substrate.
Figure 2:
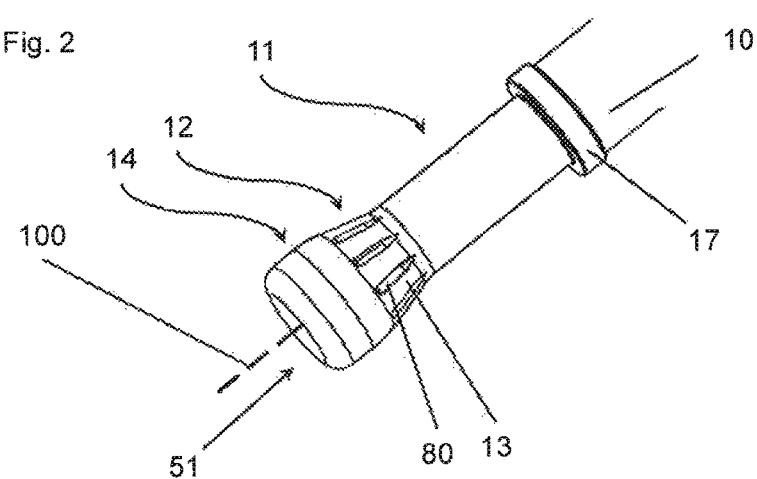
FIG. 2 is a perspective view of the bolt of the anchor from FIG. 1 in the region of the front, first end of the bolt.

FIGS. 1 to 3 show an exemplary embodiment of an expansion anchor 1 according to the invention. As in particular FIG. 1 shows, the expansion anchor 1 has a bolt 10 and an expansion element 20 designed as an expansion sleeve, and the expansion sleeve surrounds the bolt 10 in a circular manner. The bolt 10 has a neck region 11 in the region of its front end 51, an expansion cone 12 for the expansion sleeve 20 continuously attached on the front side to the neck region 11 and a tip region 14 continuously attached to the expansion cone 12 on the front side.

The bolt 10 has a substantially constant cylindrical cross-section in the neck region 11. On the expansion cone 12 attached thereto, the surface of the bolt 10 is designed as an oblique surface 13 and the diameter of the bolt 10 increases there towards the first end 51, i.e., the bolt 10 expands at the expansion cone 12 starting from the neck region 11 towards its front first end 51 and towards the tip region 14. The oblique surface 13 on the expansion cone 12 can be conical in the strictly mathematical sense, however it does not have to be. In the tip region 14, the bolt cross-section is ultimately substantially constant or increases at least towards the first end 51 less strongly than at the expansion cone 12.

The bolt 10 has a stop 17 for the expansion sleeve 20 designed, for example as an annular shoulder on the side of the neck region 11 facing away from the expansion cone 12. The bolt has a load-absorbing means 18 in the region of its rear end 52 for introducing tensile forces into the bolt 10, which is designed here by way of example as an outer thread. A nut 8 sits on this outer thread.

When the expansion anchor 1 is set, the bolt 10 is inserted into a bore hole 99 in the substrate 5 from FIG. 1 with its first end 51 forwards in the direction of the longitudinal axis 100 of the bolt 10. Due to the stop 17, which limits a displacement of the expansion element 20 away from the expansion cone 12, the expansion element 20 designed as an expansion sleeve is also, in this respect, introduced into the bore hole 99. The bolt 10 is then, for example by tightening the nut 8, pulled back out from the bore hole 99, to a certain extent, in the pull-out direction 101 running parallel to the longitudinal axis 100. Due to its friction on the substantially cylindrical wall 98 of the bore hole 99, the expansion element 20 designed as an expansion sleeve remains, in this respect, in the bore hole 99 and as a result there is a displacement of the bolt 10 relative to the expansion element 20. In the case of this displacement, the oblique surface 13 of the expansion cone 12 of the bolt 10 penetrates increasingly deeper into the expansion element 20 such that the expansion element 20 is radially expanded from the oblique surface 13 and is pressed in with the wall 98 of the bore hole 99. The expansion anchor 1 is fixed in the substrate 5 by way of this mechanism. The set state of the expansion anchor 1, in which it is fixed in the substrate 5, is shown in FIG. 1. An attachment part 6 can be fixed on the substrate 5 by means of this nut 6.

A plurality of grooves 80 are provided in the expansion cone 12 which are evenly distributed, thus with constant surface density, on the expansion cone 12. The grooves 80 extend respectively in the direction of the respectively largest gradient of the expansion cone 12, respectively parallel to a projection of the longitudinal axis 100 on the surface of the expansion cone 12. The grooves 80 all have the same axial length and end at their one side at the transition of the neck region 11 into the expansion cone 12 and at their other side prior to reaching the tip region 14. The grooves 80 locally reduce the friction between the expansion element 20 and the bolt 10 such that in fractured concrete a low friction coefficient is provided which allows the bolt 10 to be slid forwards and backwards in the expansion element 20 in the case of a fracture opening and subsequent fracture closure. Since the grooves 80 do not extend or only slightly extend into the tip region 14, the maximum friction between the expansion element 20 and bolt 10 and thus the maximum static pull-out load can, in this respect however, remain high.

The invention claimed is:

1. An expansion anchor, comprising:
a bolt; and
an expansion element;
wherein an oblique surface is disposed in a region of a first end of the bolt, wherein the expansion element is forced radially outwards when the bolt is displaced in a pull-out direction relative to the expansion element;
wherein the bolt has, in a region of a rear end of the bolt which faces away from the first end of the bolt, a load-absorber, wherein tensile forces which are directed in the pull-out direction are introducible into the bolt by the load-absorber;
and wherein a groove that is closed with respect to the first end of the bolt, such that the groove is covered and not visible when viewed from in front of the expansion anchor with a viewing direction along a longitudinal axis of the bolt, is disposed in the oblique surface and wherein the groove reduces a contact surface between the expansion element and the oblique surface.

2. The expansion anchor according to claim 1, wherein the expansion element is an expansion sleeve which surrounds the bolt at least in regions and wherein the oblique surface is formed by an expansion cone.

3. The expansion anchor according to claim 2, wherein the bolt has a tip region which attaches to the expansion cone on a side of the expansion cone that faces the first end of the bolt, wherein in the tip region a cross-section of the bolt is at least as large as a cross-section of the bolt in the expansion cone, and wherein the groove ends before the tip region or in the tip region.

4. The expansion anchor according to claim 1, wherein an expansion of the groove in an axial direction of the bolt is greater than an expansion of the groove in a circumferential direction of the bolt and wherein the groove runs along a projection of the longitudinal axis of the bolt on the oblique surface.

5. The expansion anchor according to claim 1, wherein an inner surface of the expansion element is smooth in a region of the groove and/or the expansion element does not engage into the groove.

6. The expansion anchor according to claim 1, wherein a plurality of grooves that are closed with respect to the first end of the bolt are disposed in the oblique surface and wherein the plurality of grooves reduce the contact surface between the expansion element and the oblique surface.

7. The expansion anchor according to claim 6, wherein the plurality of grooves are disposed equidistant.

8. The expansion anchor according to claim 6, wherein the contact surface between the expansion element and the oblique surface is reduced by the plurality of grooves by 20 to 50%.

9. The expansion anchor according to claim 1, wherein a maximum angular width of the groove measured in a cross-section of the bolt at the longitudinal axis is smaller than 30°.

10. The expansion anchor according to claim 1, wherein the bolt has a stop and wherein the stop limits a displacement of the expansion element away from the oblique surface.

11. The expansion anchor according to claim 10, wherein the stop is an annular shoulder.

* * * * *